United States Patent [19]

Mannhardt

[11] Patent Number: 4,941,447

[45] Date of Patent: Jul. 17, 1990

[54] METERING VALVE

[75] Inventor: Werner G. Mannhardt, Detroit, Mich.

[73] Assignee: Colt Industries Inc., New York, N.Y.

[21] Appl. No.: 312,460

[22] Filed: Feb. 21, 1989

[51] Int. Cl.[5] ...................... F02M 39/00; F16K 31/06

[52] U.S. Cl. .................................... 123/455; 123/458; 251/129.13; 251/359; 251/129.16; 137/625.33

[58] Field of Search ...................... 123/458, 455, 585; 251/129.13, 129.16, 359, 129.01, 36, 48; 137/625.33, 625.0, 625.48, 625.18

[56] References Cited

U.S. PATENT DOCUMENTS

| | | | |
|---|---|---|---|
| 3,001,757 | 9/1961 | Ball | 251/129.16 |
| 3,093,079 | 6/1963 | Graham | 123/455 |
| 3,465,732 | 9/1969 | Kattchee | 123/458 |
| 4,124,195 | 11/1978 | Braun | 251/359 |
| 4,300,595 | 11/1981 | Mayer | 251/129.01 |
| 4,519,370 | 5/1985 | Iwata | 123/585 |
| 4,572,436 | 2/1986 | Stettner | 251/129.16 |
| 4,582,085 | 4/1986 | Hafner | 251/129.16 |
| 4,588,162 | 5/1986 | Moffat | 251/129.16 |
| 4,708,117 | 11/1987 | Mesenich | 123/531 |
| 4,742,685 | 5/1988 | Hauorsen | 123/455 |

FOREIGN PATENT DOCUMENTS

| | | | |
|---|---|---|---|
| 2303450 | 8/1974 | Fed. Rep. of Germany | 251/129.16 |

*Primary Examiner*—Carl Stuart Miller

*Attorney, Agent, or Firm*—Walter Potoroka, Sr.

[57] ABSTRACT

A metering valve, simultaneously controlling a plurality of flow paths with a single poppet movable into and out of engagement with a valve seat in a duty cycle operation has the sealing surfaces of the poppet and seat formed with an accurately flat surface finish to minimize leakage when the valve is closed. The seat surface is formed with recessed areas to reduce the area of contact with the poppet surface to reduce pull-off force while maintaining adequate contact area to dissipate the closing impact forces which are further minimized by controlling the flow of fluid from between the opposed surfaces during valve closure.

9 Claims, 1 Drawing Sheet

METERING VALVE

BACKGROUND OF THE INVENTION

I. Field of the Invention

The present invention relates to a metering valve particularly adapted for use in the fuel-injection system of an internal combustion engine.

II. Description of the Related Art

In U.S. Pat. No. 4,708,117 there is disclosed a fuel-injection system for the internal combustion engine of an automotive vehicle in which a single metering valve controls the flow of fuel in equal amounts to each of the combustion cylinders of the engine. In U.S. Pat. No. 4,708,117, a preferred form of metering valve includes a flat valve seat which forms the bottom of a fuel-containing chamber. The flat surface of the seat is formed with an annular groove and a plurality of passages or fuel nozzles lead from the bottom of the groove through the valve seat member into an air chamber where the fuel is mixed with air. A valve head, such as a poppet valve, for example, having a flat seat engaging surface is reciprocated into and out of a closed position in which the flat surface of the valve head is seated on the flat surface of the seat to block fluid communication between the fuel-containing chamber and the annular recess in the valve seat. The poppet valve is the armature of a solenoid which is energized and deenergized to cyclically open and close the metering valve in response to a pulse width modulated control signal generated by a computer in response to various monitored vehicle operating conditions.

During the time period required for one revolution of the vehicle engine, the valve is held open for a portion of this time period and closed for the remainder of the time period. Normal on-the-road operation of the vehicle finds the engine typically running in the range of 1500 to 2500 revolutions per minute (rpm); thus the time within a given operating cycle during which the valve is open is measured in milliseconds. For operational as well as emissions reasons, it is essential that leakage be minimized and, in order to meet standard leakage specifications for fuel injection valves, the mating valve surfaces—i.e. the flat mating surfaces of the valve seat and the poppet must be lapped flat and maintained true to an extremely high degree of precision.

It is a well-known, although not clearly understood, fact that when two accurately flat surfaces are engaged with each other, an unexpectedly large force is required to pull them directly apart. Where, as in the particular application described above, the time period during which a valve is to be held open is measured in milliseconds, it is obviously undesirable that it is necessary to overcome a substantial initial resistance to opening movement. Further, upon initial opening of the valve, fluid fuel will flow at a substantial velocity to create a region of reduced pressure between the surfaces by the so-called Bernoulli effect, further increasing the opening force and opening time.

While these problems would seem to indicate that a solution might be found by reducing the stroke of the poppet, as well as the area of contact between the valve poppet and seat to relatively narrow annular bands at either side of the groove, this approach is limited by the laws of fluid motion and by the fact that a sufficient area of contact must be maintained to minimize wear on the sealing surface by spreading the impact of the poppet over a reasonable surface area, particularly where this area must maintain its original accurately flat surface and surface finish.

The present invention is directed to a solution of the foregoing problems.

SUMMARY OF THE INVENTION

In accordance with the present invention, no attempt is made to reduce the stroke below the value required by good design practice so that the fuel passages through the valve seat member may open directly at the upper or sealing surface of the seat, rather than into the bottom of a recessed annular groove in the seating surface. The seating surface is lapped and finished accurately flat, as in the prior art, but is also provided with a plurality of individual recesses, indentations, grooves or the like except for individual annular sealing surfaces extending only around the peripheral edges of the individual orifices in the seating surface. These annular sealing portions are covered by the flat bottom surface of the poppet when the valve is closed to provide a seal which satisfies the standard leakage specifications, but their combined sealing area is substantially less than that required by the annular groove arrangement described above. By indenting or grooving a substantial portion of the seating surface where a seal is not essential, an adequate area of engagement between the head and seat to minimize wear occasioned by valve closure is maintained while at the same time a substantial reduction of the pull-off forces is achieved.

Further, by proper design, the Bernoulli forces during opening, as well as the impact forces during closing, may be minimized by regulating the flow between the separated valve surfaces.

Other objects and features of the invention will become apparent by reference to the following specification and to the drawings.

DESCRIPTION OF THE PREFERRED EMBODIMENT

Figure 1:
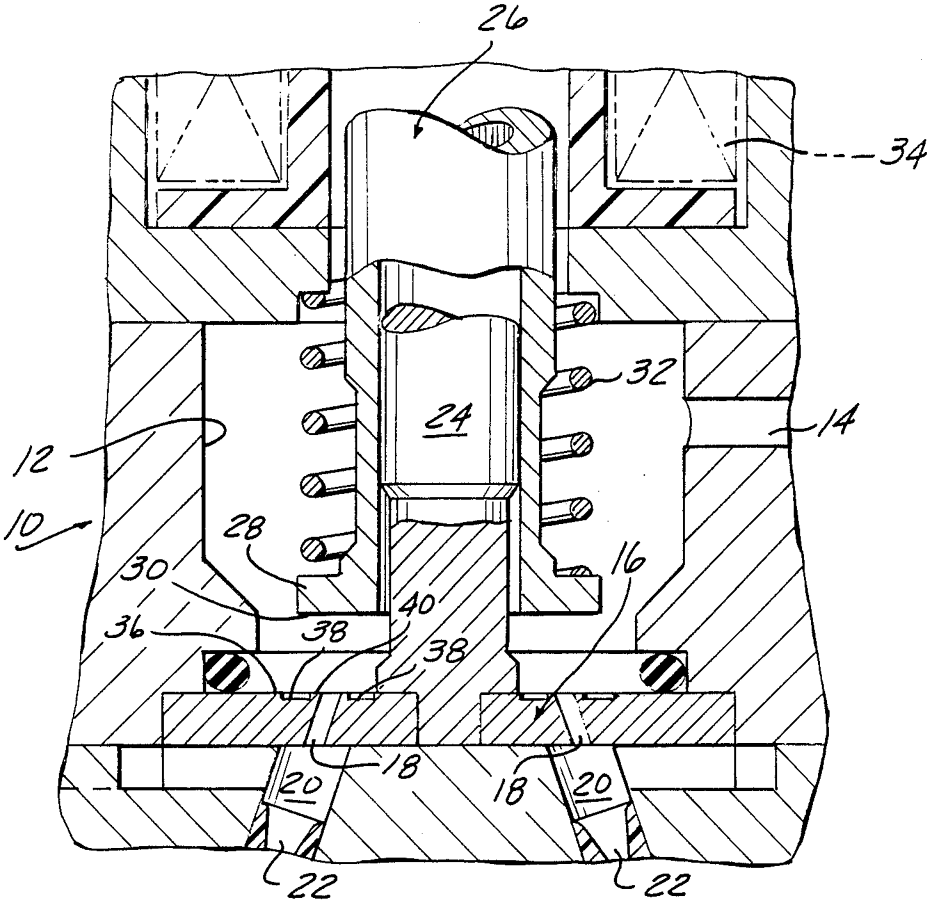
FIG. 1 is a cross-sectional view taken on an axial plane, with certain parts broken away, of a metering valve embodying the present invention.
Figure 2:
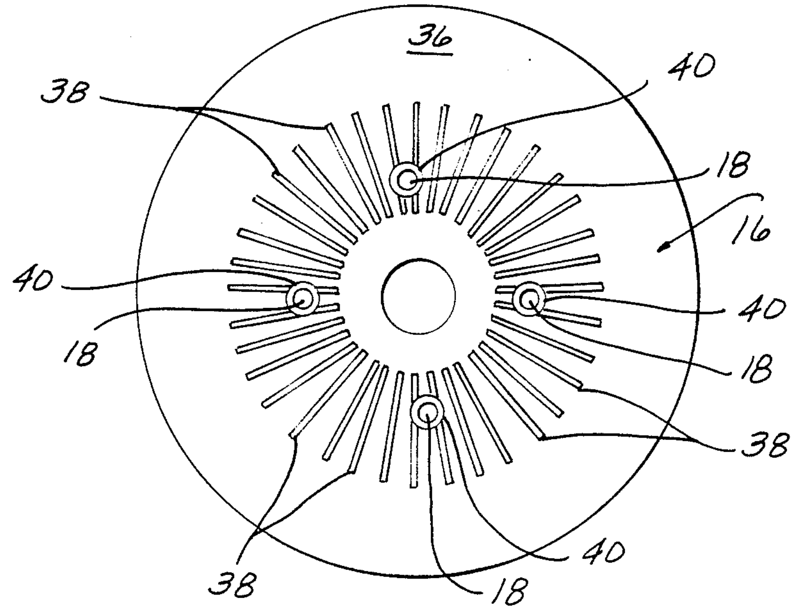
FIG. 2 is a top plan view of the valve seat member of the valve of FIG. 1.

The metering valve shown in FIG. 1 is intended to be employed in a fuel-injection system such as that disclosed in U.S. Pat. No. 4,708,117, to which reference may be made for a more complete description of the system as a whole. The metering valve includes a multi-part housing designated generally 10 having an internal fuel chamber 12 into which fuel is fed under pressure via a fuel inlet passage 14. The bottom wall of chamber 12 is defined by a valve seat member designated generally 16. A plurality of bores 18 extending through seat member 16 at a slight inclination constitute fuel passages or nozzles through which, when the metering valve is open as shown in FIG. 1, fuel passes to become mixed with air under pressure in individual mixing chambers 20 from which the fuel-air mixture passes downwardly through conduit means partially shown at 22 to the individual cylinders of the vehicle engine. As best seen in FIG. 2, the bores 18 are symmetrically disposed upon a circle centered on a central axis of valve member 16.

A center post 24 is fixedly secured to valve seat member 16 to project perpendicularly upwardly from member 16 and serve as a guide for a valve poppet member designated generally 26 which is slidably mounted upon post 24. A radially outwardly projecting flange 28 at the lower end of head member 26 is formed with a flat annular surface 30 which perpendicularly overlies the openings of bores 18 at the top of valve seat member 16 so that when head member 26 is driven downwardly by compression spring 32 to seat upon the top surface of valve seat member 16, surface 30 overlies and seals the upper ends of bores 18 from fuel chamber 12.

In FIG. 1, valve poppet 26 is shown in its open position elevated above the top surface of valve seat member 16. Valve poppet 26 is constructed of a suitable ferromagnetic material and constitutes the armature of a solenoid coil 34 which, when energized, magnetically lifts poppet 26 upwardly against the action of spring 32 to the open position shown in FIG. 1.

As explained in greater detail in U.S. Pat. No. 4,708,117, energization of the valve solenoid is under the control of a microprocessor which, in a well-known manner, monitors various vehicle operating conditions to generate a pulse width modulated signal to energize the valve operating solenoid to open the valve for a predetermined percentage of the time period of each engine valve open/closed cycle. Because the metering valve must supply one charge of fuel for each revolution of the engine, this time period varies with engine speed. With the vehicle engine running at 2000 rpm, the time period for one complete engine valve open/closed cycle would be 30 milliseconds; and during typical vehicle operating conditions within these 30 milliseconds, the metering valve might be open for only two to nine milliseconds. Because the amount of fuel which is passed by the valve is directly proportional to the amount of time during which the metering valve is open, if the valve sticks or delays in opening by as much as one millisecond, the amount of fuel passed in that open cycle is substantially affected. In that relatively small amounts of fuel are involved with an individual charge, it is also apparent that any leakage past the valve when the valve is closed is undesirable.

In order to minimize leakage, the opposed surfaces 30 of valve poppet 26 and 36 of valve seat member 16 are lapped to a precisely flat surface which is flat to within 0.3 micrometers. This precise surface finishing provides adequate sealing against leakage when the surfaces 30, 36 are engaged with each other, but increases the pull-off force necessary to separate the two surfaces from face-to-face contact with each other, thus tending to delay opening of the valve upon energization of the solenoid.

Although the phenomena which tend to bind two accurately flat surfaces in contact with each other are not fully understood, it is apparent that the pull-off force necessary to separate the two surfaces is proportional to the magnitude of the area of the two surfaces which are in contact with each other. A reduction of this area will result in a reduction of the pull-off force; however, a reduction of the areas of the valve poppet and seat which contact each other in the metering valve application here described, will also concentrate the area subject to the impact force with which the two surfaces 30, 36 are driven into contact with each other upon closing of the valve. In that in a typical automotive application, each revolution of the engine requires a closing of the valve, dissipation of the closure impact is required to avoid undue wear of the engaging surfaces.

Such dissipation is accomplished according to the present invention by forming the surface 36 of valve seat member 16 with a plurality of recess 38 which, in the embodiment shown in the drawings, take the form of grooves extending radially of the central axis member 16, as best shown in FIG. 2. In order to provide an adequate seal to prevent the flow of fuel from chamber 12 into bores 18 when valve head surface 30 is seated upon seat surface 36, annular sealing surfaces 40 are maintained in an unrecessed state around each opening of bores 18 through surface 36. Surface 36 is finally lapped or otherwise finished to the desired surface finish, and the recesses of grooves 38 may be formed by any of several conventional techniques, such as coining, electrical discharge machining, acid etching, engraving, etc. Alternatively, the recesses or grooves may be formed during the initial fabrication of valve seat member 16 as by fabricating member 16 from powdered metal, or by a casting or molding process, with surface 36 being subsequently finished to the desired smoothness.

By suitable regulation of the depth and surface finish of the surfaces of the grooves or recesses, films and boundary layers of various thickness in the fuel filling the grooves may be achieved to effect a desired damping of the closing force of the valve as fluid fuel is expelled from between the approaching poppet and seat surfaces—a so-called "squish" effect.

The recesses achieve a substantial reduction of the engaged surface area when the valve poppet is seated upon surface 16 to thereby reduce the pull-off force.

As explained in greater detail in U.S. Pat. No. 4,708,117, energization and deenergization of solenoid 34 to respectively open and close the valve is in response to a pulse width modulated signal from the vehicle on-board computer which generates this signal in response to various monitored parameters of vehicle operation. For each revolution of the engine, this signal generates a valve-open and valve-closed cycle during which the valve is held open for a percentage of the total time period of the cycle which is determined by the computer. This particular operation is commonly referred to as a duty cycle operation in which the metered flow of fuel passed by the valve is proportional to the percentage of total time during which the valve is open. The percentage of open time can be precisely regulated and adjusted by the computer far more readily than can a mechanical positioning of the valve at a partially open position. A valve which is fully open half of the time will pass the same amount of fuel as if the valve were halfway open all of the time, and it is much easier to electronically regulate the time than to mechanically regulate the position of the valve head relative to its seat. While one embodiment of the invention has been described in detail, it will be apparent to those skilled in the art that the disclosed embodiment may be modified or extended. For instance, an impact between the poppet/armature and the pole piece occurs at the end of valve opening, and the severity of this impact can be controlled by contouring the surfaces involved, making use of the described squish effect. Therefore, the foregoing description is to be considered as exemplary rather than limiting, and the true scope of the invention is that defined in the following claims.

What is claimed is:

1. In a fuel metering valve assembly comprising housing means defining a chamber adapted to contain fuel under pressure, valve seat means on one wall of said chamber defining a valve seat surface and a plurality of outlet passage bores extending through said seat means symmetrically disposed about a central axis, valve poppet means having a poppet surface mounted in said chamber for reciprocatory movement along said axis between a valve-open position wherein said head surface is spaced from said seat surface to accommodate flow from said chamber into said bores and a valve-closed position wherein said valve poppet surface is engaged with said valve seat surface in overlying relationship with said valve seat bores to block flow from said chamber into said bores, and means for cyclically driving said valve poppet means between said open and closed positions;

the improvement wherein said valve poppet surface and said valve seat surface include opposed accurately flat planar surfaces lying in parallel planes, the planar surface of said valve seat surface having a plurality of recesses therein and a plurality of annular sealing portions constituting a portion of the planar surface of said seat surface and respectively extending around each of said valve seat bores to isolate said valve seat bores from fluid communication with said recesses and said chamber when the planar surfaces of said valve poppet means and a valve seat means are engaged with each other.

2. The invention defined in claim 1 wherein said valve seat bores are uniformly spaced from each other at a common radial distance from said central axis, said planar surface of said valve poppet means extending radially from said axis by a distance sufficient to extend radially outwardly beyond the annular sealing portions of said planar surface of said valve seat surface.

3. The invention defined in claim 2 wherein said recesses in said valve seat surface lie within an annular band concentric with said axis, said band having an inner radius less than said common radius and an outer radius greater than that of said planar surface of said valve poppet means.

4. The invention defined in claim 1 wherein said recesses comprise grooves extending radially outwardly from said axis.

5. The invention defined in claim 3 wherein said recesses comprise grooves extending radially outwardly of said axis across said annular band.

6. The invention defined in claim 1 further comprising a guide post fixedly projecting from said valve seat surface along said axis, said valve poppet means having a central bore therethrough slidably receiving said guide post to guide said poppet means in movement between said open and closed positions, said valve seat bores being uniformly spaced from each other upon a circle concentric with said axis in radially outwardly spaced relationship to said guide post.

7. The invention defined in claim 6 wherein said planar surface of said valve poppet means is of an annular configuration extending radially outwardly from said guide post to an outer periphery located radially outwardly beyond the annular sealing portions of the planar surface of said valve seat surface.

8. The invention defined in claim 7 wherein said recesses comprise grooves extending radially outwardly from said guide post.

9. The invention defined in claim 8 wherein at least some of said grooves extend radially outwardly beyond the outer periphery of said planar surface of said valve poppet means.

* * * * *